United States Patent [19]

Ferretti

[11] Patent Number: 5,582,682

[45] Date of Patent: Dec. 10, 1996

[54] PROCESS AND A COMPOSITION FOR MAKING CELLULOSIC COMPOSITES

[76] Inventor: Arthur Ferretti, P.O. Box 309, Silverton, Oreg. 97381-0309

[21] Appl. No.: 251,091

[22] Filed: May 31, 1994

Related U.S. Application Data

[63] Continuation-in-part of Ser. No. 964,484, Oct. 21, 1992, Pat. No. 5,371,194, which is a continuation of Ser. No. 776,847, Oct. 15, 1991, abandoned, which is a continuation-in-part of Ser. No. 290,983, filed as PCT/US89/05680, Dec. 18, 1989, published as WO90/07541, Jul. 12, 1990, abandoned.

[51] Int. Cl.$^6$ .................................................. D21H 23/00
[52] U.S. Cl. ................. 162/10; 162/11; 162/12; 162/13; 162/100; 162/147; 162/174; 162/175; 162/189; 162/223; 162/224; 162/225; 162/DIG. 9; 264/122; 264/123; 264/124; 156/62.2; 156/62.4
[58] Field of Search ........................ 162/174, 175, 162/9, 12, 10, 11, 13, 63, 100, 147, 223, 224, 225, 182, 189, DIG. 9; 264/83, 120, 122, 124, 123; 156/62.4, 62.2

[56] References Cited

U.S. PATENT DOCUMENTS

| | | | |
|---|---|---|---|
| 1,542,539 | 6/1925 | Wright | 162/174 |
| 2,116,544 | 5/1938 | Schur | 162/174 |
| 2,534,908 | 12/1950 | Holzer | 162/174 |
| 2,654,296 | 10/1953 | McCorkle | 162/174 |
| 3,113,065 | 12/1963 | Newton et al. | 162/174 |
| 3,166,466 | 1/1965 | Puydak | 162/174 |
| 3,895,997 | 7/1975 | Haywood | 162/189 |
| 4,221,751 | 9/1980 | Haataja et al. | 162/9 |
| 4,524,164 | 6/1985 | Viswanathan et al. | 524/14 |
| 4,692,478 | 9/1987 | Viswanathan et al. | 527/300 |
| 4,828,643 | 5/1989 | Newman et al. | 156/328 |
| 4,992,519 | 2/1991 | Mukherjee | 527/300 |
| 5,008,329 | 4/1991 | Hunter | 527/103 |
| 5,008,359 | 4/1991 | Hunter | 527/103 |
| 5,017,319 | 5/1991 | Shen | 264/124 |

FOREIGN PATENT DOCUMENTS

| | | | |
|---|---|---|---|
| 50-16442 | 6/1975 | Japan | 162/174 |
| 8325 | of 1910 | United Kingdom | 162/174 |
| 600628 | 4/1948 | United Kingdom | 162/174 |
| 892744 | 3/1962 | United Kingdom | 162/9 |

OTHER PUBLICATIONS

"The Lactose–Casein (Maillard) System Browning: Volatile Components", Ferretti, Aldo, et al, Journal of Agricultural Food Chemistry, vol. 19, No. 2., 1971, pp. 245–249.

"Dairy Chemistry and Physics", Walstra and Jenness, John Wiley & Sons, N.Y.C., 1984, Chapter 17, pp. 310–311.

"The Glass Transitions of Lignin and Hemicellulose and Their Measurement By Differential Thermal Analysis", Irvine, G. M., TAPPI Journal, vol. 67, May 1984, pp. 118–121.

"The Maillard Browning Reaction: An Update", Ames, J. M., Chemistry and Industry (G.B.), vol. No. 17, Sep. 5, 1988, pp. 558–561.

"Recent Advances In Lignocellulosic Composites", Rowell, R. M., et al, Solar Energy Research Institute, SERI/TR–234–3610, Dec. 1989, pp. 2–19.

"Thermosetting Resin Intermediate", Ferretti, Arthur; International Publication No. WO 90/07541, International Patent Application PCT/US89/05680, Jul. 12, 1990.

"Assessment Of Technologies To Convert Newsprint To Higher Value Products", Energetics Inc., Columbia, MD 21046, Aug. 30, 1990, p. 9, (US DOE Contract No. DE–AC01–87CE40762, Task No. 143).

"Uncatalyzed Solvolysis of Whole Biomass Hemicellulose by Hot Compressed Liquid Water", Mok, W. S., et al, Industrial & Engineering Chemistry Research vol. 31, Apr. 1992, pp. 1157–1161.

*Primary Examiner*—Peter Chin
*Attorney, Agent, or Firm*—George W. Wasson

[57] ABSTRACT

The specification discloses an unorthodox system for manufacturing strong, light-weight and weather-resistant cellulosic composite materials from discarded paper and newsprint, and papermill sludge—and from an unlimited variety of particulated fibrous lignocellulosics—without the use of an extrinsic adhesive. Both the matrix-forming resin and the fiber-substrate, which comprise the entire composite, are spontaneously created in situ at ambient conditions by the ammoniation of a mixture of a protein-containing material and a particulated cellulosic. Heating an article shaped from such a mixture to above 175° C. polymerizes the resin and bonds the fiber-substrate into a cellulosic composite product. Also disclosed is a process for manufacturing reinforced and laminated composites as well as a composition which simplifies the production of both cellulosic composites and all-biomass thermosetting resins.

18 Claims, No Drawings

PROCESS AND A COMPOSITION FOR MAKING CELLULOSIC COMPOSITES

RELATED APPLICATIONS

The present application is a continuation-in-part of Ser. No.964,484 filed Oct. 21, 1992, now U.S. Pat. No. 5,371,194, which was a continuation of application, Ser. No.776,847, filed Oct. 15, 1991, abandoned, which was a continuation-in-part of application, Ser. No.290,983, filed Dec. 28, 1988, abandoned. An International Application, PCT/US89/05680, filed Dec. 18, 1989, abandoned, corresponding to application Ser. No. 290,983, was published Jul. 12, 1990, as International Publication WO 90/07541.

1. Field of the Invention

This invention relates to a process for making cellulosic composites in which both elements that form the composite—the thermosetting resin and the fiber substrate—are created in situ, entirely from biomass material. The utility of the invention is extended to the fabrication of reinforced and laminated composite materials by using the in situ-created resin to bond strengthening material mixed with or applied to the substrate. A key feature of the invention is a composition that facilitates manufacture of these composite products as well as the all-biomass thermosetting resins disclosed in U.S. Pat. No. 5,371,194 of Ferretti.

2. Background and Summary of The Invention

In accordance with the widely held belief that cellulosic biomass must be dissociated into separate, less complex substances before it is useful as a chemical-process feedstock, orthodox conversion systems typically begin with a severe, degradative procedure. High-temperature, acid-catalyzed, hydrolysis is the most common method for obtaining simpler substances, e.g., pentose and hexose sugars, that are later used in separate product-making operations. Systems-hardware and energy consumption costs alone tend to make such schemes unprofitable; expenses related to the disposition of unavoidably created waste materials or secondary byproducts have invariably made them commercially impractical.

Research into the behavior of cellulosics treated by a system that runs entirely counter to such orthodox procedures has produced results that are contrary to all expectations—as well as many precepts of the prior art. The conversion system disclosed herein presents a technical solution to the cost-of-conversion dilemma that is not only distinctly original but inherently economic.

Stemming from a newly defined ambient-temperature reaction-pathway, this original approach enables the direct and immediate conversion of a portion of a particulated cellulosic feedstock to a thermosetting resin which, when polymerized, reconstitutes the residual feedstock-solids into a strong, weather-resistant and light-weight composite material. The linch-pin, or first-tier, technology disclosed herein is directed to the creation of a set of inherently new materials that present a multitude of design opportunities at the second, or product engineering, tier.

Applicant's co-pending application, Ser. No. 964,484, discloses a method for converting mixtures of materials that contain a carbohydrate and a protein to resins useful for bonding particulate matter and as a post-production treatment for improving the properties of paper products. The underlying reaction-pathway, first promoted in the carbohydrate-protein mixtures that naturally occur in the dairy byproduct, whey, was found capable of producing a variety of all-biomass polymers now recognized as expressions of a previously undefined terminal phase of the Maillard (glucose-amine) reaction. The reaction, and a fully developed Maillard resin, is realized—spontaneously—by raising the pH of a suitably composed mixture of carbohydrate and protein containing materials to alkalinity with ammonia. When heated to about 175° C. or above, these otherwise stable resins condense, release water, and form thermoset polymers.

A narrow, but remarkably effective branch of this Maillard resin-forming pathway was discovered when a particulated cellulosic was employed as the carbohydrate reactant in such a resin-forming mixture. Together with a Maillard resin, this mixture produced a resin-soaked residue of fibrous solids directly convertible by heat to a composite material. In contrast, typical orthodox composites employ resins and substrates prepared on an individual basis in separate operations. For clarity, cellulosics are divided into 3 recognizable categories: fibrous lignocellulosics (e.g., bagasse, wood, straw, stover, etc.), refined cellulosics (i.e., paper and paper-related byproducts), and delignified cellulose powder.

COMPOSITE VARIETIES

Composites are the hybrid materials that result when two distinctly different materials, commonly termed a matrix and a substrate, are combined to form a new material with an integral structure. Although supporting elements, extenders or properties-modifying agents are frequently added to reduce cost or impart special features, fiber is most often included as part or all of the substrate bound by or embedded in a polymeric matrix. The matrix controls composite strength and geometry, transfers external loads to the substrate, and protects it from environmental and structural damage. Composites are multi-phase, heterogeneous materials that fulfill functional roles as distinguished from agglomerates, the superficially bonded clusters primarily used to facilitate the handling of powdery materials.

Substrate, as used in describing the cellulosic composites disclosed herein, means the feedstock-residue solids that remain after a Maillard resin has been created from a particulated cellulosic feedstock and which, upon polymerization of the matrix-forming resin, forms the skeletal structure of the composite. A substrate may contain all or a portion of the resin, water, and unreacted or partly-reacted raw materials—in addition to inert fiber or structural materials added by design, or the impurities and extraneous matter, such as clay, ash, and minerals, typically found in refined cellulosics and fibrous lignocellulosics.

The hallmarks of this system are its applicability to all 3 cellulosic categories, and the absence of effluent streams and the elaborate equipment and severe, lengthy procedures that tend to make orthodox bio-conversion techniques inefficient. Inasmuch as products made in accordance with the core procedure of this system, ammoniation, can be synthesized directly from low and negative value biomass, it affords many environmental and economic benefits.

The product is termed a reinforced composite when a structural element or subsidiary fiber is added to a substrate for the express purpose of improving strength. Another construction with improved strength, a laminated composite, or laminate, is composed of at least two discrete elements of dissimilar material or structure, one of which is a composite or reinforced composite.

BASIS OF THE INVENTION

Applicant's original patent application Ser. No. 290,983, published as International Publication WO 90/07541, disclosed that selective recombination of the components of whey—lactose and whey protein—with ammonia does not yield a thermosetting resin unless all three of these reactants are present, and that other bases, such as NaOH and KOH, are not effective substitutes for ammonia. These results demonstrated that an ammonia-specific reaction-pathway, which yields a thermosetting resin from a mixture of a denaturable protein and a glucose-containing reducing sugar, had been isolated.

The treatment strategy employed to create a resin from whey permeate, the derivative first yielding a resin, was then utilized to define the limits of biomass utility. By approximating the naturally occurring glucoside-to-protein ratio of whey permeate in mixtures synthesized from whey protein and diverse carbohydrates, and ammoniating these mixtures, thermoset polymers were obtained from every ammoniated mixture that contained glucose, or a water soluble or comminuted glucoside-containing feedstock. The change in color of glucosidic-sugar-derived polymers from amber to jet-black during condensation (with coincident weight loss) confirmed these polymers as expressions of a terminal-phase Maillard reaction. Sources of the requisite glucosidic reactant were found to include materials which contain glucose, sucrose, lactose, starch and, unexpectedly, cellulose—both cellulose powder and finely comminuted, but otherwise unrefined, lignocellulosics (e.g., −100 mesh pine wood-flour). Because hemicellulose and lignin did not inhibit the polymer-forming reactions, these components were assumed to be non-essential and their potential contribution to the reaction was not immediately recognized.

Flours made from protein-rich pulse, such as soy protein isolate (SPI), soy protein concentrate and ordinary soy flour, which contain about 93, 67 and 52 percent protein, respectively, were found to satisfy a very practical goal: replacement of whey protein (a costly, hygroscopic material) with a more manageable and less costly material. In resin-forming reactions involving glucose, sucrose, lactose, or starch, urea was found to be effective as a protein-containing-material equivalent.

Although ordinary soy flour is often the most economic, flours made from other leguminous beans and seeds, and protein-rich wheat, to the extent they contain protein, are useful protein-containing reactants. The natural adhesive and gelling tendencies of such flours makes them effective extenders and fillers that facilitate substrate bonding; other than cost, there is no drawback to using such a flour in an amount excess to reaction requirements.

WATER CRITERIA

Measurements to confirm the least amount of moisture required at the outset of a Maillard reaction revealed a notable discrepancy between published data and results obtained when, as in the present invention, the reaction is induced with ammonia. After being dried to constant weight (ostensibly-dry) and held under vacuum, a mixture of corn and soy flours (in a weight-ratio of about 20:1) reacted spontaneously to form a porous but frangible, bright-yellow, semi-solid when the vacuum was relieved with dry ammonia gas. The subsequent behavior of this dry-reacted mixture was indistinguishable from an identically composed resin prepared in aqueous medium—pulverized, admixed with water and heated to about 175° C., it formed a strong and insoluble thermoset polymer.

Numerous references state that water is indispensable to a Maillard reaction; e.g., Walstra and Jenness—in Dairy Chemistry and Physics, John Wiley & Sons, 1984, in the text and FIG. 17.5, pp. 310–311—indicate the reaction-rate peaks at about 10% water but ceases entirely below about 5%. Applicant's results indicate that no unbound water is required or, more likely, ammoniation obviates the need for water—except for the moisture inherent in ostensibly-dry mixtures, which is supplemented by water from the initial condensation reactions. Consequently, carbohydrate and protein containing materials in their commonly encountered, or as-produced, condition contain a more than ample supply of water; i.e., the routine amount normally found in commodities or, for cellulosics, the water remaining after it has been collected or reclaimed, or de-watered, dried, pulped, repulped, or otherwise conditioned for use as a stock material in an industrial process.

This aspect of the invention—the ability to make resins and composite-forming mixtures that are, in some instances, essentially dry—affords major process-engineering advantages. Ready-to-use composite-forming mixtures can be made from as-produced biomass components and ammonia—without the specific addition of water as a reactant or reaction-medium. This minimum-water technique is also applicable to preparation of the Maillard resins previously disclosed in Applicant's co-pending application, Ser. No. 964,484. By minimizing the addition of water (and its obligatory later removal) the energy, cost and environmentally related benefits of the invention are further enhanced.

Nevertheless, as a means for making composite-forming mixtures with a consistency amenable to unification, i.e., consolidation and shaping, and particularly, as a diluent to increase the mobility of the matrix-forming resin during the laminate-making procedure, water-content is a vital aspect of product manufacturing mechanics. When unified and sufficiently heated, an assembly of a layer of a resin-substrate mixture adjoined by a resin-saturable web will form an integral laminate—if the water-content of the mixture has been adjusted to a fully-wetted condition prior to being unified. A fully-wetted condition exists when a resin-substrate mixture, as it achieves capillarity (minimum void-volume) during unification, is able to exude resin sufficient to permeate and fully impregnate an adjoining resin-saturable web applied to a substrate surface.

CELLULOSICS AS FEEDSTOCKS

Economic remedies for the under-utilization and improvident disposal of cellulosics have been sought for decades. The problems are both rural and urban: fibrous lignocellulosics, such as straw, bagasse, stover and forestry-waste, are often field-burned; in cities, refined cellulosics, such as discarded office paper and newsprint, accumulate relentlessly and, together with the dewatered sludges evolved during paper-processing, are mostly land-filled. Analyses of materials representing these 2 cellulosic categories are listed in Table 1, below, along with an analysis of delignified cellulose powder furnished by a supplier of this commodity.

TABLE 1

| Compositional Analyses of Cellulosics (% Dry Wt.)* | | | |
|---|---|---|---|
| Material | Hemicellulose | Cellulose | Lignin |
| Newsprint | 18.0 | 55.5 | 25.0 |
| Corn Stover | 28.1 | 36.5 | 10.4 |
| Wheat Straw | 50.0 | 30.0 | 15.0 |
| Bagasse | 20.4 | 41.3 | 14.9 |
| Coniferous Wood | 20–30 | 40–50 | 25–35 |

TABLE 1-continued

Compositional Analyses of Cellulosics (% Dry Wt.)*

| Material | Hemicellulose | Cellulose | Lignin |
|---|---|---|---|
| Delignified Cellulose Powder - (Solka Floc) | 7.0 | 90–95 | 0.2 |

*Except for the analysis of −100 mesh delignified cellulose powder (Solka Floc, provided by James River Paper Co.), these data are from Table 3, p. 9, of the report, "Assessment Of Technologies To Convert Newsprint To Higher Value Products", prepared by Energetics Inc., Columbia, MD 21046, 8/30/90, for the U.S. DOE.

The composition of sludges evolved during cellulosic processing operations, such as paper and fiber-board making, paper recycling, vacuum molding, and similar processes, varies with both process and plant design. After dewatering, sludges contain about 60% water and an organic-solids dry-weight of about 30–80 percent—mostly cellulosic fiber too short to be coalesced into a product during a processing operation. Despite this shortcoming, sludges evolved in such operations are excellent composite feedstocks.

Although repulped paper can be converted into superior quality composites, the bonds between sheets of whole, but un-repulped, newsprint, processed by otherwise identical methods, are sparse and resulting specimens delaminate easily. Fibrous lignocellulosics, e.g., straw, bagasse, and wood-fiber, also exhibit dimensional sensitivity and must likewise be particulated (milled, chopped, or otherwise cut) to obtain a particle size of about 3 mm or less, or fiber with a length:width ratio of at least about 10 and a roughly-uniform distribution of lengths with an upper limit of about 1 cm.

Evidently, an increase in available cellulosic components and reaction sites, along with an intimate association of substrate elements, must be developed before the generalized bonding typical of a sound composite can be attained. Particulation, employed to disrupt the steric configuration of cellulosics or to release the mechanically-bound fiber in paper, provides the required increase in accessibility to cellulosic components and reaction sites.

Paper products made from the furnish supplied to conventional cellulosic-fiber processing operations exhibit the qualities of a composite when the process of the present invention is interposed in the operations. Furnish is the paper industry term for the aqueous slurry of particulated cellulosic fiber supplied to product coalescing (unifying) apparatus, such as machines for making fiber-board or paper, vacuum-molding, or other product-making equipment, able to employ an aqueous slurry of particulated cellulosic fiber.

A thermosetting Maillard resin is formed by admixing with such furnish a mixture of an effective amount of a protein-containing material and ammonia in a quantity sufficient to ammoniate the resulting admixture to alkalinity. When the resin incorporated within a coalesced, or unified, admixture-product (either paper or a shaped article) is heated to between about 175° C. and about 260° C. for an interval of time sufficient for resin polymerization, the stiffness and tear strength of the resulting product, in both the wet and dry condition, is improved. Introduction of a resin-forming mixture prior to product unification distinguishes this procedure from the post-production treatment of paper products disclosed in co-pending application, Ser. No. 964,484.

Many excellent feedstocks, including sludge from cellulosic processing operations, fiberized wood, sawdust, paper-furnish and discarded paper (which requires only repulping), either occur in a particulated state or require little or no physical preparation. Even the lignocellulose used to make microcrystalline cellulose powder is particulated to short fiber before it is delignified.

Despite their abundance and low cost, fibrous lignocellulosics are under-utilized as composite substrates, except in heavily glued products such as particle board. In the article, "Recent Advances In Lignocellulosic Composites"—Solar Energy Research Institute, SERI/TR-234-3610, Dec. 1989, pp. 2–19—R. M. Rowell, et al, USDA, Forest Products Laboratory, Madison, Wis., states: "The key to a successful composite made with lignocellulosic material and another material is to improve the compatibility between the two. Composites have been made with lignocellulosic materials in combination with plastics, synthetic fibers, or glass, but in most cases the properties of the resulting composites were not as good as they could have been. Research is under way in several laboratories in the world to make hygroscopic (polar) lignocellulosics more compatible with hydrophobic (non-polar) materials. This is being done either by grafting onto the lignocellulosic material or adding a coupling agent to make them more compatible."

Because they resist bonding, are insoluble in water and are, in general, physically intractable, lignocellulosics are seldom used as chemical or composite feedstocks. These handicaps are, however, readily overcome by the composite-making system of the present invention: Maillard resins derived from cellulosics are water-soluble and incorporate protein, which together remedy the surface incompatibility; and, the intractable nature of cellulosic fiber becomes an asset—as the primary element of the substrate, the short, stiff fiber enhances integrity and improves strength.

FUNCTIONS OF PROTEIN AND AMMONIA

Protein performs two vital functions in the present invention; its defining role is to react with any available glucosides, in the presence of free ammonia, to form a thermosetting Maillard resin. Its secondary, almost equally important, function is to provide a high level of compatibility and cooperative bonding between this resin and various materials that usually resist such attachment.

Compared to common (hydrophobic, non-polar) synthetic resins, which are naturally incompatible with hydrophilic materials, water-soluble protein-containing Maillard resins are readily adsorbed on (polar) lignocellulosics and other unlikely materials, including metals and glass. This natural adsorption, and the ease with which most cellulosic structures imbibe water, fosters adhesion and the diffusion of the continuous aqueous-phase resin into the pores and interstices of the substrate material, thereby eliminating the need for supplemental adhesives, compatibility-enhancing agents or the grafting which are often required by non-polar, hydrophobic resins.

Experimental evidence, coupled with data on the effects it is known to have on cellulosic components, reveals that ammonia has the capacity to perform several tasks central to the manufacture of cellulosic composites. These include: a) creating the alkaline environment that prompts dissolution of accessible components of the particulated cellulosics at the outset of the resin-forming process; b) reacting with protein, and exposed and dissolved cellulosic components to create the matrix-forming resin; c) neutralizing, or preventing the formation of, organic acids known to form in early Maillard reactions; d) facilitating the softening, flow and self-organization of cellulosic components, primarily lignin, during unification in the glass transition-temperature range; and e) providing the supplemental nitrogen that appears to promote or enhance the formation of melanoidin polymers.

The polymer-forming ability of the resins disclosed herein is undiminished when the pH of already-composed resins is lowered to about 5 with an acid (such as $H_2SO_4$), or when used as a binder for acidic particulate, e.g., pyrite-rich coal-fines. The irrelevance of pH after resin formation, coupled with the specificity of the reaction to ammonia, strongly suggests that nitrogen, supplied to the resin-forming mixture by ammonia, influences the formation of these polymers. Melanoidins, brown-black compounds characteristic of many late-stage Maillard reactions and often described in the literature as nitrogenous, clearly dominate the jet-black thermoset polymers derived from glucosidic sugars described herein. In "The Maillard browning reaction—an update", by J. M. Ames, pp. 558–561, Vol. No.7, Chemistry and Industry (G.B.), Sep. 5, 1988, the first 3 properties of melanoidin polymers are listed as: "1) Brown, high molecular weight, complex, furan ring-containing and nitrogen-containing polymers; 2) Vary in structure according to the reactants and conditions of preparation; 3) Possess a carbon: nitrogen ratio that increases with temperature and time of heating". The publication does not, however, suggest inducing the reaction with either ammonia or nitrogen, but does describe three different, pH-dependent, reaction-pathways to melanoidin products, and remarks that Maillard reaction chemistry "remains obscure, . . . (and) the chemistry of the melanoidins, . . . produced in the final stages of the reaction is even less well known."

As-produced cellulosics imbibe ammonia much as they do water; either alone, or in mixture with other forms of biomass or with process-inert materials, ammonia is absorbed from any convenient source—gaseous, aqueous solutions, the anhydrous liquid—even dry ammonia-evolving compounds. The manufacturing flexibility gained by using a dry compound may, however, be tempered by changes in process parameters and mechanics required to accommodate the peculiarities of a specific compound. For example, when using ammonium bicarbonate (which releases $CO_2$, decomposes at 54° C., and has a solubility of only 20 g/100 cc water at 20° C.), resin-substrate development may be slowed unless water is added and/or the mixture is warmed above ambient; a provision for the escape of $CO_2$ gas released during heating may also be required.

Visible changes in biomass materials and their mixtures often accompany ammoniation, e.g., beige corn flour turns bright yellow, and aqueous dispersions undergo slight but perceptible reductions in viscosity and increases in solubility. Ammonia aggressively combines with any available moisture and, as a result, less than totally dehydrated, i.e., as-produced, biomass is readily ammoniated with ammonia from any convenient source.

CELLULOSIC COMPOSITE CHARACTERISTICS

The surfaces of cellulosic composites are smooth, tough-skinned and hydrophobic; internally, they are composed of hollow cellules with fillet, or web-like, bonds between individual fibers. Typically light, porous, and somewhat flexible, they address the need for strong, tough, yet light-weight, materials that is not met by the near-solid composites made with liberal amounts of dense adhesives. Moreover, by manipulation of variables that govern product performance, the technical requirements of a wide range of existing, as well as entirely new, products can be satisfied. Among the variables which control composite characteristics are: feedstock chemistry, reactant amounts, use of reinforcing elements, and process mechanics, such as the means and compressive force used during unification, particulation extent, water-content, the method and duration of heating, and specific polymerization temperature.

The compressive force applied during unification and polymerization controls the surface texture, density, transmissivity and, partially, composite strength. Although the compression needed to achieve capillarity, by expressing virtually all gases entrapped in the residue-substrate mixture is modest (often only 40–50 psi), it nevertheless yields a sound, very light-weight composite.

Strength is notably improved, however, when higher levels of pressure and temperature, and a less dilute resin are utilized. Conventional shaping and unification apparatus, e.g., compression, hot-roll, and vacuum forming, molding, pressing, extrusion, wire-screen (paper-web) deposition and calendaring, and even hand-layup, are suitable when adapted to the specifics of the resin-substrate mixture and to the features desired in the composite product. Standard water-removal techniques (e.g., pressing and evaporation) and heating systems (e.g., conductive, convective and microwave) may likewise be adapted to cellulosic composite manufacture. A fully thermoset polymeric matrix is only obtained, however, when heat is applied for an interval sufficient to raise the internal temperature of a resin-substrate mixture to at least about 175° C.

FEEDSTOCK COMPONENT INTERACTIONS

The ability to manufacture cellulosic composites directly, and in their entirety, from a broad variety of ammoniated biomass mixtures is attributed to a combination of the chemical reactions and phase transformation, sorption and interdiffusion that occur at local interfaces in the mixtures, and within and among cellulosic components. The resulting self-organized structure is evidently the product of a series of collaborative reactions that continue throughout the entire resin and composite forming procedure.

Maillard resins in dilute aqueous medium assume a variety of forms depending on the compositional analysis and state of division of the feedstock: sugars yield clear, amber solutions; whey and its derivatives produce mostly translucent dispersions; starchy grain-flours provide cloudy-to-opaque liquids; and, cellulose powder and particulated lignocellulosics yield clear-amber and murky dark-brown solutions, respectively, along with similar-colored feedstock residues of seemingly unchanged raw materials.

The residues remaining after all mobile resin was expressed from resin-making mixtures made with particulated cellulosics were initially considered solid waste and, therefore, a limitation of feedstocks that generate such remnants. Unexpectedly, however, it was discovered that when intensely heated these solid wastes are directly transformed into fully-formed composites comprised of a cellulosic-fiber substrate and an in situ-created thermoset polymeric-matrix. Moreover, by managing the quantity of water available during the resin-forming procedure, either a combination of a liquid resin and a composite-forming (feedstock-residue) mixture, a fully-wetted mixture, or, simply, a composite-forming mixture (in a ready-to-unify and heat condition) may be obtained.

As disclosed in the co-pending application, Ser. No. 964,484, a Maillard resin derived from cellulose powder is effective as a water-insoluble binder for inert particulate. Superficially, the polymeric-matrix of a composite made from cellulose powder seems merely an expedient expression of the same basic set of reactions. Bonding in such a composite is, however, stronger and even more tenacious than that developed in agglomerates of process-inert particulate bound with an identical resin—indicating a beneficial and special sort of cooperation between this resin and the residue of the cellulose powder from which it was derived. Composites made from refined cellulosics and fibrous lignocellulosics exhibit even more pronounced and unexpected improvements in strength.

The fundamental stoichiometry of the reaction(s) that forms a cellulosic composite has been delineated, but such knowledge has limited relevance to the actual practice of the invention. For example, the quantity and variety of components made available to the composite-forming reaction(s) by a particulated lignocellulosic depend largely on compositional-analysis. But even within a single botanical genus, composition varies widely—not only within genus-species, but on a varietal, geographic and seasonal basis. Rarely is the compositional-analysis of a cellulosic feedstock constant or even controllable. Therefore, systematic prediction of the impact that continually changing feedstock chemistry will have on the quality and physical properties of a completed composite is impractical. Alternatively, providing the level of treatment needed to supply feedstocks according to narrow dimensional and compositional specifications would defeat a primary goal of the invention: the beneficial use of a wide variety of as-produced, marginal-value, biomass with minimal preparatory treatment.

Extended to feedstock combinations, such as a mixture of wood-fiber and repulped newsprint, or variable process-byproducts, e.g., paper-processing sludge collected from batch operations, the difficulties stemming from variations in compositional-analysis are compounded. In the article, "The Lactose-Casein (Maillard) System Browning: Volatile Components", by Aldo Ferretti et al in the Journal of Agricultural Food Chemistry, Vol. 19, No. 2., 1971, pp. 245–249, 80 compounds formed in the early (80° C.) phase of a Maillard reaction in a model lactose-casein system are identified. Cellulosic composite-making mixtures are, however, far more complex and equivocal than a precisely modeled 2-part system. Moreover, because these mixtures of cellulosics undergo intense thermal treatment, unpredictable secondary reactions, particularly among impurities and non-essential components, are virtually assured.

To the extent they are available, the two components of lignocellulose not originally considered essential to the Maillard resin-forming reaction—lignin and hemicellulose—interact with reactants that are essential (protein, cellulose and ammonia), and with each other, to provide the superior sort of cooperative bonding found in the cellulosic composites.

The patents and publications in the field, with respect to the properties of these non-essential components under the conditions attending formation of Maillard resins and polymers, are consistent with such interactions. U.S. Pat. No. 4,828,643 of W. Newman, Liquified Cellulosic Fiber, Resin Binders . . . , and U.S. Pat. No. 5,017,319 of K. C. Shen, Method of Making Composite Products From Lignocellulosic Materials, and related articles, i.e., The Glass Transitions of Lignin and Hemicellulose and Their Measurement . . . by G. M. Levine in the TAPPI Journal, pp. 118–121, Vol 67, May '84, and Uncatalyzed Solvolysis of Whole Biomass Hemicellulose by Hot Compressed Liquid Water, by W. S. Mok et al, in Industrial and Engineering Chemistry Research, Vol 31, pp. 1157–1161, April '92, offer especially useful information about the interrelationships and potential for cooperative reactions among these non-essential components. For example, the primary goal of the work reported by Mok "was to quantitate hemicellulose removal, sugar recovery, co-solubilization of cellulose and lignin, and the composition of the residue . . . " of hot-water-dissolved biomass.

In the TAPPI Journal article, Irvine describes the lignocellulosic structure as: closely associated lignin and hemicellulose form a lignin-hemicellulose matrix surrounding the cellulosic microfibrils, and bonding is believed to occur between them. Mok restates the "well-known concept of an amorphous region (of cellulose) which solubilizes easily in ... pure water.", and reports hot (200° C.), compressed water dissolves hemicellulose completely (with recovery of monomeric—hexose and pentose—sugars at 95%) while partially dissolving lignin, cellulose and sample-mass (averaging 40, 18 and 56%, respectively). Newman, in the '643 patent, discloses a method of liquefying up to 95% of the cellulosic fibers in sawdust and hardboard-process sludge in alkali solution at 140° C. and 150 psi. This liquified lignocellulosic fiber is then used to substitute for phenol in phenol-formaldehyde resins. Shen notes, in the '319 patent, that hemicellulose is "largely amorphous in nature, has great accessibility to water and . . . is decomposed about 100 times faster than cellulose . . . ". Shen teaches a method for selectively dissolving the hemicellulose of lignocellulosics with (only) pressurized steam at 150° C., mentions that lignin is also decomposed and hydrolyzed to low molecular weight lignin and lignin products, and that only cellulose fiber remains unchanged. Shen claims the dissolved hemicellulosics obtained by steam treatment as a thermosetting resin.

Irvine reports that lignin, hemicellulose and the amorphous portion of wood-cellulose each exhibit a glass transition (the temperature at which there is a change from a glassy state to a rubbery, plastic state), and that the single transition observed in wood is derived essentially from lignin. The glass transition temperature is reported by Irvine as: dependent on water-content and, at moisture-saturation, is below room temperature; and, to some extent, dependent on hemicellulose swelling induced by dilute alkali solution. At a moisture content of about 0.10 g/g of dry solid, both hard and softwood have transition temperatures below 120° C., even without alkali treatment.

When correlated to the conditions under which: a) a Maillard resin is derived from a cellulosic feedstock; b) a composite is created and bonded in situ; and c) final condensation reactions take place, the foregoing data on the properties of non-essential components provides a pragmatic basis for the unexpected strength observed in cellulosic composites, especially products derived from refined cellulosics and particulated fibrous lignocellulosics—but only when the role of protein in the reaction is considered. No reference, however, suggests the addition of a proteinaceous substance to induce an ambient temperature, resin-forming reaction.

Co-pending application '484 discloses that an ammoniated mixture of cellulose powder and protein in aqueous medium yields a clear-amber thermosetting resin at room temperature, while the dark-brown color of resins obtained from particulated lignocellulose announces the presence of dissolved lignin. The clear resin is described as solubilized amorphous cellulose and, from published data on reactions of non-essential cellulosic components and ammonia, it is virtually certain that dissolved hemicellulosics (hexoses) are also present and participate, as glucosides, with protein in the resin-forming reaction.

As the temperature of a unified composite-forming mixture is raised, and in the presence of water in the as-produced cellulosic and from condensation, additional amorphous cellulose is presumably dissolved and, with additional dissolved hexoses, participates in the on-going polymer-forming reactions. The results, evidenced by continued condensation, a darkening product-color and improved composite strength after high temperature exposure, are consonant with the patents and published data on cellulose and hemicellulose treated with alkali, with water (steam), or with heat.

Other likely sources of matrix-forming polymeric material are solubilized lignin (a phenolic-type thermoplastic) and the pentose sugars of hemicellulose (mainly xylose), which are dissolved into a Maillard reaction-system known to include furan-type compounds. It is quite possible, therefore, that resins of the phenol-furfural variety are also involved when cellulosic composites are prepared from refined cellulosics and fibrous lignocellulosics.

At a temperature of about 175° C., and even when dry, all visco-elastic components of lignocellulose (hemicellulose, lignin and amorphous cellulose) are, according to Irvine, susceptible to the phenomenon of glass transition, become plasticized and are able to flow within and among substrate (cellulosic) fiber. After composite formation, formerly discrete lignocellulosic particles are diffuse, without identity and, rather than adhered or bonded, appear to be amalgamated (without distinct boundaries) into a unified structure.

Although the reactions that appear to operate both in parallel and in tandem to produce these new composites have not been fully elucidated, it is clear that each component of a cellulosic feedstock has the potential, and several opportunities, to join in such combinations. It is also clear that to be effective as reactants, a significant portion of these components must be made accessible by particulation to the ammonia-initiated reaction with protein.

A composite of the present invention can, therefore, be described as the product of a terminal-phase Maillard reaction, which product is obtained by the unification and high temperature treatment of a mixture of a protein-containing material and a particulated cellulosic that has been ammoniated to alkalinity.

REACTANT PARAMETERS

Ammoniation, the key step in the synthesis of Maillard resins, is defined in Applicant's co-pending application '484 as treating with ammonia to the extent an alkaline pH is achieved. In the synthesis of Maillard resins and in the manufacture of cellulosic composites, ammoniation can be more distinctly defined as providing ammonia sufficient to: a) create the alkaline condition that fosters dissolution of, and makes available, components of the carbohydrate feedstock; b) initiate and sustain the resin-forming reaction(s); c) facilitate self-organization and plastic flow at elevated temperatures in feedstock-residue solids (if present); d) negate the influence of organic acids; and e) ostensibly, supply nitrogen to the reaction system.

There is no apparent reaction-based upper limit on the amount of either ammonia or protein, and only economic penalties attend the use of amounts excess to the requirements of the resin (or composite) forming reaction. Quantities of ammonia and protein just sufficient to react all available carbohydrate feedstock components are, however, critical minimums for making a product with the peak, or optimum, strength realizable from a given feedstock by a prescribed, or standard, method of preparation.

The influence on composite strength of variables—such as the extent of particulation and moisture-content of a given cellulosic, and the means and operational details of unification and heating—is sharply curtailed when a standard method is employed in all composite preparation steps—from initial biomass treatment(s) to matrix-resin polymerization. When all such variables are actively controlled or meet the prescribed values of a standard method, cellulosic composite strength becomes solely a function of feedstock chemistry and the amounts of ammonia and protein-containing material present in a composite-forming resin-substrate mixture.

A COMPOSITION FOR BIOMASS CONVERSION

Therefore, when a standard method of preparation is employed, there is a composition, or singular combination of minimum amounts of ammonia and a protein-containing material, that will, in mixture with a given particulated cellulosic feedstock, yield a cellulosic composite with the optimum strength realizable from this feedstock. Clearly, such a composition not only makes conversion of a given particulated cellulosic to a resin-substrate mixture that will yield an optimum strength cellulosic composite routine, it is also the most cost-effective reactant mixture for the purpose.

The effective amount of protein-containing material for such a composition is fixed by adjusting the pH of a measured quantity of the given particulated cellulosic to $\approx 9$ with ammonia, and then incrementally adding the designated protein-containing material until an amount is defined above which the strength of composites made by an otherwise standard method becomes constant. The quantity of ammonia sufficient for use in this composition is found by incrementally raising the pH of a mixture of now-fixed amounts of the designated protein-containing material and the given cellulosic feedstock until a quantity of ammonia is defined above which the strength of composites made by an otherwise standard method becomes constant. A suitable measure of composite strength is resistance-to-bending, the industry standard. This empirical approach—using product-strength measurements to quantify the reactants in the composition—overcomes the obscure chemistry of the reaction(s) as well as the somewhat unpredictable compositional analyses of both cellulosic and protein-containing materials.

In the context of converting a given feedstock to an optimum strength cellulosic composite by a standard method, the foregoing procedure: a) fixes the ratio of reactants to each other in a mixture of chemicals, or composition; b) defines the proportion, or relevant ratio, in which this composition is mixed with the given feedstock to accomplish this conversion; and c) can be used to avoid undue experimentation when the concentration of a reactant is uncertain or a cellulosic with a novel or ambiguous chemistry is encountered. The slight, but always-positive, difference between the stoichiometric amounts and those established by this procedure is useful, and often necessary, as a concession to the stochastic nature of biomass and the reactant-deficiencies it may otherwise periodically introduce.

Because of its generic character, the prescribed procedure is also applicable to the formulation of analogous compositions which, when used to prepare the resins disclosed in co-pending application Ser. No. 964,484, will yield optimum-strength Maillard polymers. The make-up and relevant ratio of a composition utilized to make such resins from a feedstock containing glucose or a glucoside can be defined by substituting a specific feedstock and a standard method of preparation in the prescribed procedure, along with a suitable test of polymer strength. The improvement in tensile-strength and water-resistance of paper, and the crush-strength and insolubility of polymer-bound agglomerates of process-inert particulate are satisfactory tests of the strength of thermoset Maillard polymers.

Generically, this composition is defined as that mixture of a protein-containing material and ammonia which produces a thermoset polymeric product having the optimum strength realizable from a given glucose- or glucoside-containing feedstock when the feedstock and the composition are mixed in the relevant ratio for the given feedstock and a standard method of preparation is employed.

THE PRIOR ART

A method for making a thermosetting Maillard resin, by ammoniating a mixture of a carbohydrate and a protein to a pH above 7, was disclosed in patent application, Ser. No. 290,983, was published as International Publication No. WO 90/07541, Jul. 12, 1990, and, consonant with then-existing theory, carbohydrates useful in making the resin were limited to glucose-containing reducing sugars. The group of resin-making carbohydrates was enlarged to include all glucoside-containing materials in the invention subsequently disclosed in co-pending application Ser. No. 964,484. The resins of the latter application were found to be especially useful as strong, insoluble binders for particulate matter and for improving the strength and water-resistance of paper products.

Earlier resins developed as adhesives for particle-board and plywood, which include protein-containing whey permeate as a feedstock, are disclosed in U.S. Pat. Nos. 4,524,164 and 4,692,478 of Viswanathan et al. The processes of these patents require lengthy high-temperature acid-hydrolysis of a carbohydrate feedstock, do not include cellulosics as a starting material, and yield resins only later used in a separate procedure to bond lignocellulosics.

The processes of Viswanathan et al exemplify the limitations of prior art methods of fabricating lignocellulosic composites, which almost invariably require the adhesive or matrix-forming resin to be separately prepared in a degradative procedure at high pressure and temperature before being combined with lignocellulosic materials. The applicable prior art includes: U.S. Pat. No. 5,017,319 of Shen, which discloses steam-hydrolysis of lignocellulosics to make a thermosetting (hemicellulosic) resin; U.S. Pat. No. 5,008,359 of Hunter, wherein a lignocellulosic substrate is impregnated with an isocyanate prior to consolidation; the starch-based binder of Mukherjee disclosed in U.S. Pat. No. 4,992,519, which requires not only an earlier-prepared adhesive but the addition of a curing agent in the final stage of composite fabrication; and the resin preparation disclosed in U.S. Pat. No. 4,828,643 of Newman wherein liquified cellulosics are utilized as a partial replacement for phenol in phenol-formaldehyde resins.

In summary, the prior art does not disclose a room temperature process for the in situ creation, solely from biomass, of a mixture of a substrate and a thermosetting matrix-forming resin that can be directly polymerized by heat to a cellulosic composite. The absence in the prior art of a comparable process precludes existence of a corresponding process-enabling composition.

THE PREFERRED EMBODIMENT

In this embodiment, repulped newsprint (refined cellulosics with comparatively-uniform analyses) is used to demonstrate the manufacturing process and the physical attributes of the product. Specifically, cellulosic composites are very light-weight—yet unusually strong—with tightly-closed polymeric surfaces.

Discarded newsprint is first repulped (particulated) with about an equal amount of water in standard maceration equipment to the extent the coherency of the newsprint-paper is thoroughly disrupted and a damp, loose mat of dissociated cellulosic fiber, but not a liquified pulp, is produced. To obtain a unifiable resin-substrate mixture, about 20 parts (wt.) as-produced soy protein isolate-flour (SPI) is mixed with about 100 parts (wt.) of repulped fiber and a quantity of aqueous ammonia (usually about 4 parts by weight of 26% solution per 120 parts of SPI-fiber mixture) sufficient to adjust the pH of the SPI-fiber mixture (usually about 5.9) to at least 8.0. This amount of SPI is an effective amount of protein-containing material for this feedstock, i.e., an amount at least sufficient to react al 1 the cellulosic components made available by the ammoniation of repulped (particulated) newsprint.

The resin-substrate mixture is then pressed (unified) into a board between about 1.0 mm and about 2.0 cm thick and heated for an interval of time sufficient to raise the internal temperature to at least about 175° C. The level of pressure applied—preferably in the range of about 40–55 psi—must be sufficient to achieve and maintain capillarity (minimum void-volume) without expressing an appreciable amount of resin from the mixture. Reduction of resin loss during pressing and heating, caused by too much moisture in the mixture, is preferably achieved by reducing the amount of water used during repulping rather than a reduction in clamping pressure.

The resulting composite material has a very low density (specific gravity≈0.35–0.45), a smooth, tightly-closed polymeric (hydrophobic) surface, and an M.O.R. of about 530 psi. (M.O.R. is Modulus Of Rupture, i.e., failure in bending measured by ASTM Method D-1037). Corrected for density-difference to provide a comparison with standard medium-density hardboard, which has a specific gravity of at least 1.1 and an M.O.R. of 2500–3000, this cellulosic composite material has an M.O.R. in excess of 3000. Cellulosic composites made by the process of the present invention are especially useful in product applications where low-weight, high strength-to-weight ratios good surface-finishes and very low raw materials cost are valued.

Inspection of a sectioned specimen of a cellulosic provides a rationale for the high bending-strength. The thermoset polymer, which provides tightly-closed surfaces, is heavily concentrated at and adjacent to these surfaces but diminishes in the direction of the composite interior. During resin-substrate heating, the resin, along with evaporating process-water, evidently migrates toward the composite-press interfaces, accumulates, is polymerized at/near composite surfaces, and effects a case-hardening. Internally, the structural pattern is very different; the core is quite porous and composed of small, open celulules boundaried by web-bonded fiber. A low press-force and excellent resin-cellulosic compatibility apparently combine to encourage resin flow toward, and the accumulation and polymerization at and near, the composite periphery. The configuration is analogous to a structure with a light-weight core sandwiched between and bonded to plastic film(s). Manufacturing a product with equivalent features using a heavy and viscous, hydrophobic resin, and high levels of compression—tenets of current industry practice—appears impractical.

Within this low-pressure procedure the options include: a) interrupting the heating process after the unified resin-substrate mixture is essentially dry but before the resin is fully polymerized, subjecting the dry, unified mixture to a post-forming operation, and then reheating the post-formed mixture until resin polymerization is complete; b) decreasing process-water by mixing with, a partially air-dried mat of a particulated cellulosic (as a substitute for aqueous ammonia), an equivalent quantity of ammonia gas, anhydrous liquid ammonia, or a dry ammonia-evolving compound; and c) utilizing, in place of the reactants, SPI and ammonia, a composition, the make-up and amount of which is established for a particulated feedstock by the method set forth in the above section titled: A Composition For Biomass Conversion. To obtain a composite with the internal distribution of polymer imparted by this low-pressure procedure, process-water sufficient to facilitate resin migration during unification and heating must, however, be retained in the resin-substrate mixture.

The low-pressure procedure may be modified by: a) adjusting the amount of process-water and increasing the pressure during resin-substrate unification to make hardboard-like products with higher density and rupture-force values; b) raising the temperature of polymerization to induce advanced condensation reactions that increase matrix strength; and c) adjusting the amount of process-water used with paper-making furnish or in repulping to obtain a resin-substrate slurry amenable to unification in paper-making or vacuum-molding to make, respectively, cellulosic composites similar to, but much stronger and water-resistant than, ordinary paper, or cellulosic composites in contoured, complex shapes.

MATERIALS, METHOD & EXAMPLES

The materials described below, and in Table 2, are representative of the many feedstocks, reinforcing elements, and reactants suitable for use in making the three basic products of the present invention: i.e., cellulosic composites and reinforced and laminated cellulosic composites. The Examples described in Table 3. typify the products that can be made with these materials and reactants.

Cellulosic feedstocks: 3 different categories of cellulosics (Table 2, §I.–§III.)—refined cellulosics, fibrous lignocellulosics and cellulose powder—described in detail in the section, Cellulosics as Feedstocks, above, can be successfully converted to composites by employing the reactants and process conditions indicated in Examples §I.A.1. to §III.K.2. of Table 3.

Reinforcing fiber: a variety of fiber, exemplified by those listed in Table 2, §IV., may be mixed with resin-substrates derived from cellulosic feedstocks (§I.–§III., Table 2) to make reinforced composites (Examples R.C.-1. to R.C.-3., Table 3). An adequate supply of resin is insured by adding the reinforcing fiber to the substrate-forming mixture prior to ammoniation. In addition to wood, glass and metal fiber, this group includes fiber of materials naturally compatible with Maillard resins, e.g., ceramic, carbon and process-inert synthetic-polymer fiber. (Process-inert means a material that does not degrade in the environment of the process.) When cut or chopped (if necessary) to random lengths (up to about 3 cm in length) and admixed with a particulated-cellulosic and protein-containing-material mixture (prior to mixture ammoniation), fiber notably increases composite strength. The increase depends on the size, material, and the amount of fiber added, a functional amount of which ranges from below 1% to about 50% by weight of as-produced feedstock. Except when lignocellulosic fibers are used, the mixture's in situ formed resin-supply typically becomes marginal at fiber concentrations above this range, and a resulting product is regarded as a bonded material rather than a composite.

Fiberized wood is listed in Table 2 as both a feedstock (§II.H.) and a reinforcing fiber (§IV.A.), indicating that lignocellulosic fiber, differentiated only by fiber-length, are useful as either or both components of a reinforced cellulosic composite. They are singularly advantageous when combined with refined cellulosics; not only do they join in resin-formation—chemically—they also act as mechanical reinforcing elements. Unlike the non-cellulosic fibers of §IV.4.B and C., the functional amount of lignocellulosic fiber is limited only by fiber-length as it affects the mechanics of admixing with ;and unification of the substrate. Fiberized wood is made by mechanical fibrillation of forest or urban wood-waste and is commercially available in a wide variety of graded products, e.g., 20–80 $\mu$m diameter x discrete ranges of length, such as 0 to 5 mm, or 2 mm to 3 cm.

Laminating webs: the webs listed in Table 2,. §V., represent woven cloth, non-woven, air-laid or needled textiles, or paper, made from materials such as glass, carbon, ceramic, cotton, lignocellulosics, and process-inert polymeric fiber, which are resin-saturable, i.e., webs that are permeable to and easily impregnated with resins from fully-wetted resin-substrate mixtures. Mechanical capture of individual fibers in a web by polymerized resin, as well as adhesion among and between such fibers and with the substrate, is fostered by resin saturability. The blotter paper (0.05 mm thick; % 240 gm/m$^2$) used in Example L.C.-1., is especially effective; after resin polymerization, the resulting tough, smooth, hydrophobic sheath cannot be peeled or separated without rending or destroying the web or substrate integrity.

Laminated cellulosic composite Examples, L.C.-1. to L.C.-3, Table 3, were made by applying a resin-saturable web to one surface of a layer of fully-wetted resin-substrate mixture, and then unifying the mixture-web assembly in a press at about 50 psi to obtain capillarity in the assembly. The assembly was then heated for a time sufficient to raise its internal temperature to at least about 175° C. A resin-substrate mixture may include reinforcing fiber and, during assembly, individual webs may be applied to more than one surface of a layer of the substrate-mixture, or assembled mixture-webs may be stacked to make a sandwich-type construction.

Reactants: to present readily interpreted and easily compared Examples, and to demonstrate the consistent nature of the process, only a single type of protein-containing material (soy protein isolate—SPI) and one ammonia form (aqueous solution, 26% wt.) were utilized in the preparation of the Examples of Table 3.

Methodology: cellulosics of categories §I–§III—after being mixed with an effective amount of SPI, ammoniated, unified in a press at about 50 psi to a minimum void-volume, and subjected to a temperature of about 175° C.—yielded a composite with a cellulosic-fiber substrate bound by a thermoset polymeric matrix (except as noted under Polymerization Extent in Table 3). Failure to achieve complete polymerization may result from inadequate: a) ammoniation (Example §I.A.1.); b) particulation (Example §I.A.2.); c) heating (Example §I.A.4.); or d) protein (Examples §I.A.3. and §III.K.2.). The utility of lignin-free cellulosics is illustrated by Example §III.K.2. Adjustment of water-content is occasionally necessary to accommodate feedstock absorbency, mechanical resistance to unification, and attainment of capillarity without appreciable resin loss. The water-content of many as-produced feedstocks, such as bagasse, sawdust and repulped newsprint, is adequate for unification to capillarity without adjustment; other as-produced feedstocks may require the removal (e.g., sludges from papermill operations) or addition of water (e.g., particulated stover, fiberized wood, and straw) to facilitate unification.

It should be understood that the embodiments and examples disclosed herein are presented for illustrative purposes only and that many other combinations and articles that embody the process and the composition will be suggested to persons skilled in the art and, therefore, the invention is to be given its broadest interpretation within the terms of the following claims.

TABLE 2

Representative Feedstocks, Materials & Reactants
(Examples Employing these Ingredients Are Summarized in TABLE 3)

| CELLULOSIC FEEDSTOCKS: | | Weight % (Dry) | | Fiber | |
|---|---|---|---|---|---|
| §I. Refined Cellulosics: | | Cellulosics* | Legnin | Screen Size | Conditioning: |
| | A. Discarded Newsprint | 74 | 23 | 0–40 mm | Repulp $H_2O$, ≈40–50% |
| | B. Sludge, Mixed Paper | 62 | 32 | 0–20 mm | Adjust $H_2O$, ≈40–50% |
| | C. Sludge, Recycled Paper | 58 | 18 | 0–20 mm | Adjust $H_2O$, ≈40-50% |
| /§II. Fibrous Cellulosics: | | | | | |
| | D. Straw, Wheat | 80 | 15 | 0–1.0 cm | Adjust $H_2O$, ≈15–30% |
| | E. Straw, Grass Seed | 72 | 18 | 0–1.0 cm | Adjust $H_2O$, ≈15–30% |
| | F. Bagasse, Sugar Cane | 61 | 15 | 0–1.0 cm | Adjust $H_2O$, ≈20–40% |
| | G. Stover, Corn | 65 | 10 | 0–1.0 cm | Adjust $H_2O$, ≈15–30% |
| | H. Fiberized Wood | 70 | 25 | 0–1.0 cm | Adjust $H_2O$, ≈20–50% |
| | J. Mixed Sawdust | 60 | 20 | 0–3 mm ⌀ | Adjust $H_2O$, ≈20–50% |
| §III. Cellulose Powder: | | | | | |
| | K. Solka Floc | 97 | 0.2 | 0–100 mesh | Adjust $H_2O$, ≈10–25% |

*Combined cellulose and hemicellulose content.
REINFORCING FIBER:

| §IV. Material: | Diameter | Length | Characteristics |
|---|---|---|---|
| A. Fiberized Wood | 0.05–1.5 mm | 0.05–3.0 cm | De-structured/fiberized |
| B. Glass Monofilament | 8–15 μm | 0.3–2.0 cm | Chopped tow, yarn or roving |
| C. Metal Monofilament | 6–12 μm | 0.5–3.0 cm | Cut and separated tow, yarn. |

LAMINATING WEBS:

| §V. Material: | Description: |
|---|---|
| A. Unsized Blotter Paper | Exemplifies preferred resin-saturable web. |
| B. Woven Glass Monofila. | Representative of cloth, screen, open-netting. |
| C. Needled Glass Monofila. | Represents needled, air-laid webs, non-wovens. |

| REACTANT: | Protein-Containing Material: |
|---|---|
| Soy Protein Isolate: | Protein Content = 91% (Wt.) |

| REACTANT: | Ammonia: |
|---|---|
| Aqueous Ammonia: | $NH_3$ Concentration = 26% (Wt.) |

TABLE 3

Representative Examples - Results Summary
(Cellulosic Composites Incorporating Table 2 Materials*)

COMPOSITE EXAMPLES:

| EXAMPLE # Feedstock, Reactants, Conditions | | | | Polymerization Extent | | | |
|---|---|---|---|---|---|---|---|
| §I. Refined Cell. | Polymer. Temp. | pH—($NH_3$) | | | | | Comment: |
| (SPI = Soy Protein Isolate) | (T° C.) | ($NH_3$; Y or N) | None | Partial | Complete | (≈$H_2O$ Content) | |
| A.1. Newsprint w/SPI | 190° | 5.9(N) | X | o | o | Repulped; ≈45% | |
| A.2. Newsprint w/SPI | 190° | 8.1(Y) | o | X | o | Sheets; ≈30% | |
| A.3. N'sprnt w/o SPI | 190° | 8.1(Y) | X | o | o | Repulped; ≈45% | |
| A.4. Newsprint w/SPI | 160° | 8.1(Y) | X | o | o | Repulped; ≈45% | |

TABLE 3-continued

Representative Examples - Results Summary
(Cellulosic Composites Incorporating Table 2 Materials*)

| | | | | | | | |
|---|---|---|---|---|---|---|---|
| A.5. Newsprint w/SPI | 190° | 8.1(Y) | o | o | X | Repulped; ≈45% |
| B. Sludge M'xd w/SPI | 190° | 8.5(Y) | o | o | X | Adjust ≈50% |
| §II. Fibrous Cellulosic: | | | | | | |
| D. Straw, Wheat w/SPI | 190° | 8.5(Y) | o | o | X | ≈30% $H_2O$ |
| E. Straw, Grass w/SPI | 190° | 8.5(Y) | o | o | X | ≈30% $H_2O$ |
| F. Bagasse, S.C. w/SPI | 190° | 8.5(Y) | o | o | X | ≈40% $H_2O$ |
| G. Stover, Corn w/SPI | 190° | 8.5(Y) | o | o | X | ≈30% $H_2O$ |
| E. Fiberized Wd w/SPI | 190° | 8.5(Y) | o | o | X | ≈40% $H_2O$ |
| F. Mixed Sawdst w/SPI | 190° | 8.5(Y) | o | o | X | ≈40% $H_2O$ |
| §III. Cellulose Powder: | | | | | | |
| K.1. Solka Floc w/SPI | 190° | 7.5(Y) | o | o | X | ≈20% $H_2O$ |
| K.2. Solka Fl w/o SPI | 190° | 7.5(Y) | X | o | o | ≈20% $H_2O$ |

*(To provide comparative results, only examples employing feedstocks of Table 2 in combination with Soy protein Isolate (SPI) & Aqueous Ammonia as reactants, are included in the Table.)

REINFORCED COMPOSITE EXAMPLES:

| EXAMPLE # | Materials Combination (wt. %); | (Product Attributes)** |
|---|---|---|
| R.C.-1. | Cellulosic I.A.4. (Newsprint) 90% + Fiber IV.A. | (Fiberized Wood) 10%. |
| R.C.-2. | Cellulosic I.B. (Sludge) 85% + Fiber IV.B. | (Glass Monofilament) 15%. |
| R.C.-3. | Cellulosic II.F. (Sawdust) 95% + Fiber IV.C. | (Metal Monofilament) 5%. |

**Ammoniated mixtures of representative materials - Feedstocks (§I. & §II.); Soy Protein Isolate (SPI); and Fiber (§IV.) (listed in Table 2) - were all converted to Reinforced Cellulosic Composites with notably improved strength at ≈180° C.

LAMINATED COMPOSITE EXAMPLES:

| EXAMPLE No. | Materials/Combinations; | (Product Attributes)† |
|---|---|---|
| L.C.-1. | Cellulosic §I.A. (Newsprint) | +Non-woven Web (§V.A. - Blotter Paper) |
| L.C.-2. | Cellulosic §I.B. (Sludge) | +Woven Web (§V.B. - Glass Monofil. Cloth) |
| L.C.-3. | Cellulosic §II.A. (Straw) | +Air-laid Web (§V.C. - Needled Glass Fiber) |

†Ammoniated mixtures of the representative materials used in Examples L.C.1.–L.C.3. were all converted to Laminated Cellulosic Composites at ≈180° C. (Feedstocks §I. & §II.; Soy Protein Isolate (SPI) and Lamination Webs §V. - listed in Table 2). After polymerization, it was not possible to separate a web from a composite substrate without tearing, dissociating or otherwise damaging one or both elements of the laminate. Substitution of a resin- substrate-reinforcing fiber mixture, such as used in R.C.-1 to R.C., above yields an even stronger Laminated Composite.

I claim:

1. A process for manufacturing a cellulosic composite with a essentially of a thermoset Maillard resin wherein both a carbohydrate reactant of said resin and a substrate-forming solids-residue are derived from a particulated cellulosic feedstock, which process comprises:

a) ammoniating to alkalinity a mixture of amounts of said cellulosic feedstock and a protein-containing material effective to create said resin and obtain a cellulosic composite-forming mixture;

b) unifying said composite-forming mixture with a consolidating and shaping means that applies pressure at least sufficient to express virtually, all entrapped gases from the resulting unified mixture; and c) heating said unified mixture at a temperature between about 175° C. and about 260° C. for an interval of time sufficient to produce said cellulosic composite.

2. The process of claim 1 for manufacturing a cellulosic composite wherein:

(a) said particulated cellulosic feedstock is a fibrous lignocellulosic, a refined cellulosic, or delignified cellulose powder, or any mixture of said particulated cellulosic feedstocks;

(b) said protein-containing material is whey, a protein-containing whey-derivative, or a flour made from pulse or a protein-rich wheat, or a mixture of said protein-containing materials; and (c) said composite-forming mixture is created by employing ammonia in the form of a gas, an aqueous solution, anhydrous liquid ammonia, or a dry ammonia-evolving compound.

3. The process of claim 1, which process includes the additional step of post-forming said unified composite-forming mixture during an interruption of said heating, which interruption is made to occur after said unified mixture is essentially dry but before said resin of said composite-forming mixture is thermoset.

4. A cellulosic composite manufactured by the process of claim 1 wherein said particulated cellulosic feedstock is a mixture of fiberized wood and a sludge evolved during a cellulosic-processing operation, said protein-containing material is a flour made from pulse or a protein-rich wheat, and said means for consolidation and shaping is hot-roll or vacuum forming, pressing, molding, or extrusion, or a combination of said means.

5. A process for manufacturing a reinforced cellulosic composite wherein a functional amount of random-length fiber is mixed with said particulated cellulosic feedstock of claim 1 prior to the preparation of said mixture of said feedstock and said protein-containing-material.

6. The process of claim 5 wherein said particulated cellulosic feedstock is a sludge evolved during an operation selected from the group of cellulosic processing operations consisting of paper or fibre-board making, paper recycling, and vacuum molding, or a combination of said operations, and said random-length fiber is made from a material selected from the group consisting of glass, metal, lignocellulosics, process-inert synthetic polymers, ceramics and carbon, or a mixture of random-length fiber made from said materials.

7. A reinforced cellulosic composite manufactured by the process of claim 6 wherein said particulated cellulosic feedstock is a paper-recycling sludge, which sludge contains the impurities and minerals found in a sludge evolved during a paper-recycling operation, and the material from which said random-length fiber is made is a lignocellulosic.

8. The process of claim 1 wherein said process incorporates an essentially-dry cellulosic-composite-forming mixture, which process comprises:

a) ammoniating to alkalinity a mixture of amounts of a nominally-dry particulated cellulosic feedstock and a nominally-dry protein-containing material effective to create said resin and obtain said essentially-dry cellulosic composite-forming mixture;

b) unifying said essentially-dry composite-forming mixture with a consolidating and shaping means that applies pressure at least sufficient to express virtually all entrapped gases from the resulting unified mixture; and c) heating said unified mixture at a temperature between about 175° C. and about 260° C. for an interval of time sufficient to produce said cellulosic composite.

9. The essentially-dry cellulosic composite-forming mixture obtained during the process of claim 8 wherein the form of ammonia employed to ammoniate said mixture of a cellulosic feedstock and a protein-containing material is anhydrous liquid ammonia, a dry ammonia-evolving compound, or a gas, said nominally-dry cellulosic feedstock is a sludge evolved during a paper-recycling operation, and said nominally-dry protein-containing material is a soy flour.

10. A cellulosic composite manufactured in accordance with the process of claim 8.

11. A cellulosic composite comprised of a matrix, which matrix consists essentially of a thermoset Maillard resin formed by a protein-carbohydrate reaction, and a cellulosic fiber substrate wherein both a carbohydrate reactant of said resin and a substrate-forming solids-residue are derived from a particulated cellulosic feedstock.

12. The cellulosic composite of claim 11 wherein said matrix is created in situ.

13. The cellulosic composite of claim 12, wherein said particulated cellulosic feedstock is:

(a) a fibrous lignocellulosic, or a mixture of fibrous lignocellulosics;

(b) a refined cellulosic selected from the group consisting of repulped paper, paper-making furnish, or a sludge, which sludge is evolved during a cellulosic-processing operation, or a mixture of said refined cellulosics;

(c) delignified cellulose powder; or (d) any mixture of said particulated cellulosic feedstocks.

14. The cellulosic composite of claim 13, wherein said cellulosic feedstock is a mixture of a fibrous cellulosic and a sludge evolved during a paper-recycling operation, which sludge contains the impurities and clay, ash, and minerals found in a paper-recycling sludge.

15. A single-step process for manufacturing a cellulosic composite with a matrix consisting essentially of a thermoset Maillard resin wherein both a carbohydrate reactant of said resin and a substrate-forming solids-residue are derived from a particulated cellulosic feedstock, and wherein a mixture of amounts of said cellulosic feedstock and a protein-containing material effective to create said resin will produce said cellulosic composite when said mixture is ammoniated to alkalinity, unified and subjected to said single process step, which step is comprised of heating said ammoniated and unified mixture at a temperature between about 175° C. and about 260° C. for an interval of time sufficient to produce said cellulosic composite.

16. The process of claim 15 wherein said heating is effected in a consolidating and shaping means that applies pressure at least sufficient to express virtually all entrapped gases from said ammoniated and unified mixture.

17. A process for manufacturing a cellulosic composite with a matrix consisting essentially of a thermoset Maillard resin with the optimum strength realizable from a particulated cellulosic feedstock, wherein both a carbohydrate reactant of said resin and a substrate-forming solids-residue are derived from said cellulosic feedstock, which process comprises:

a) admixing with said cellulosic feedstock a mixture of the minimum amounts of ammonia and a protein-containing material that will yield, after the resulting admixture has been sufficiently compressed and heated, a cellulosic composite with the optimum strength realizable from said cellulosic feedstock;

b) compressing said admixture with force sufficient to express therefrom virtually all entrapped gasses; and c) heating said compressed admixture at a temperature of at least about 175° C. until said matrix-forming resin is thermoset.

18. The process of claim 17 wherein said particulated cellulosic feedstock is a fibrous lignocellulosic, a refined cellulosic, or a mixture of said particulated cellulosics, said protein-containing material is a soy flour, whey, or a protein-containing whey derivative, said ammonia is an aqueous solution, or a dry ammonia-evolving compound, and the means for compressing said admixture is hot roll or vacuum forming, molding, pressing, or extrusion.

* * * * *

UNITED STATES PATENT AND TRADEMARK OFFICE
CERTIFICATE OF CORRECTION

PATENT NO. : 5,582,682
DATED : December 10, 1996
INVENTOR(S) : Arthur Ferretti

It is certified that error appears in the above-identified patent and that said Letters Patent is hereby corrected as shown below:

Claim 1
Column 19, line 41, after "with a" insert --matrix consisting--.

Claim 1
Column 19, line 51, remove the comma after "virtually".

Signed and Sealed this

Twelfth Day of May, 1998

Attest:

BRUCE LEHMAN

Attesting Officer

Commissioner of Patents and Trademarks